United States Patent
Bruehler et al.

(10) Patent No.: US 10,612,709 B2
(45) Date of Patent: Apr. 7, 2020

(54) PIPE ELEMENT HAVING A COMPOSITE PIPE AND A METAL CONNECTOR

(71) Applicant: VOITH PATENT GMBH, Heidenheim (DE)

(72) Inventors: Juergen Bruehler, Traunreut (DE); Patrick Teichelmann, Hallbergmoos (DE); Benjamin Seip, Munich (DE)

(73) Assignee: Voith Patent GmbH, Heidenheim (DE)

( * ) Notice: Subject to any disclaimer, the term of this patent is extended or adjusted under 35 U.S.C. 154(b) by 869 days.

(21) Appl. No.: 14/786,228

(22) PCT Filed: Apr. 4, 2014

(86) PCT No.: PCT/EP2014/056767
§ 371 (c)(1),
(2) Date: Oct. 22, 2015

(87) PCT Pub. No.: WO2014/173653
PCT Pub. Date: Oct. 30, 2014

(65) Prior Publication Data
US 2016/0097478 A1    Apr. 7, 2016

Related U.S. Application Data

(60) Provisional application No. 61/815,016, filed on Apr. 23, 2013.

(30) Foreign Application Priority Data

Apr. 22, 2013 (DE) .......................... 10 2013 207 206

(51) Int. Cl.
*F16L 19/06* (2006.01)
*F16L 47/24* (2006.01)
(Continued)

(52) U.S. Cl.
CPC ............ *F16L 47/24* (2013.01); *E21B 17/003* (2013.01); *E21B 17/042* (2013.01); *F16L 9/128* (2013.01);
(Continued)

(58) Field of Classification Search
CPC ............ F16L 19/06; F16L 47/24; F16L 9/128
See application file for complete search history.

(56) References Cited

U.S. PATENT DOCUMENTS 4,647,078 A    3/1987 Lundy
4,813,715 A    3/1989 Policelli
(Continued)

FOREIGN PATENT DOCUMENTS

EP    1065422 A1    1/2001

*Primary Examiner* — Anna M Momper
*Assistant Examiner* — James A Linford
(74) *Attorney, Agent, or Firm* — Laurence A. Greenberg; Werner H. Stemer; Ralph E. Locher (57) ABSTRACT

A pipe element includes a pipe made of fiber-reinforced plastic and at least one metal connector, which is connected to the pipe in such a way that the connection can transmit torques and axial forces. The metal connector has a thread, in particular a conical thread, or a flange, by way of which thread or flange the metal connector can be screwed to another metal connector of an additional pipe element in order to connect two pipe elements. The metal connector surrounds the pipe on the outside by way of a connection region. A counter sleeve is present, which has contact with the inside of the pipe by way of a connection region. The metal connector and the counter sleeve each have a cylindrical thread, by way of which the metal connector and the counter sleeve are screwed to each other.

20 Claims, 5 Drawing Sheets

(51) Int. Cl.
  *F16L 9/128* (2006.01)
  *E21B 17/042* (2006.01)
  *E21B 17/00* (2006.01)
  *F16L 15/00* (2006.01)
  *F16L 15/06* (2006.01)
  *F16L 23/12* (2006.01)
  *F16L 47/14* (2006.01)
  *F16L 47/16* (2006.01)

(52) U.S. Cl.
  CPC ............ *F16L 15/001* (2013.01); *F16L 15/06* (2013.01); *F16L 19/06* (2013.01); *F16L 23/12* (2013.01); *F16L 47/14* (2013.01); *F16L 47/16* (2013.01)

(56) References Cited

U.S. PATENT DOCUMENTS

| | | |
|---|---|---|
| 5,332,049 A | 7/1994 | Tew |
| 2005/0145406 A1 | 7/2005 | Hall et al. |
| 2007/0152441 A1* | 7/2007 | Jennings ............... E21B 17/085 285/90 |
| 2014/0125053 A1* | 5/2014 | Raynal ................ E21B 17/043 285/333 |
| 2014/0166308 A1* | 6/2014 | Steen ...................... E21B 17/08 166/380 |

\* cited by examiner

PIPE ELEMENT HAVING A COMPOSITE PIPE AND A METAL CONNECTOR

BACKGROUND OF THE INVENTION

Field of the Invention

The invention relates to a pipe element which has a pipe of fiber-reinforced plastics material and at least one metal connector and which is connected to the pipe in such a manner that the connection can transmit torques and axial forces, and which has a thread, in particular a conical thread, or a flange, by means of which the metal connector can be screwed to another metal connector in order to connect two pipe elements. In addition, the invention relates to a method for producing such a pipe element.

Such pipe elements having a pipe of fiber-reinforced plastics material, in particular from CRP (carbon-fiber-reinforced plastics material) and a metal connector for connecting two pipe elements are known in the prior art, for example, with drill rods for petroleum drilling operations, in order to provide drilling rods which are lighter than the previously conventional steel drilling rods. CRP provides a high level of strength and rigidity with comparatively low weight. However, it can only be subsequently processed in a very limited manner and it is hardly possible to produce load-bearing connection components therewith, such as, for example, threads. Metal connectors which are secured to the pipe end are therefore used. The connection between the metal connector and the plastics material pipe is carried out in the prior art by means of pins which are radially inserted. In order to be able to transmit high torques and forces and to be able to withstand the unfavorable ambient conditions, a plurality of sufficiently large sized pins distributed over the periphery are required. It is disadvantageous that the assembly of such a pipe element is thereby relatively complex. Furthermore, sufficient material must be present in the connection region, both in the plastics pipe and in the metal connector, so that the weakening resulting from the holes for the pins can be compensated for. This inevitably leads to relatively thick and bulky connection regions or to pipe elements which can withstand little loading. A further solution is provided by adhesive connections. However, it is difficult for these to be constructed so as to be reliable in terms of their quality.

BRIEF SUMMARY OF THE INVENTION

An object of the invention is to provide a pipe element so as to have a connection between the metal connector and fiber-reinforced plastics pipe, which connection is simpler to assemble, more reliable and which takes up less space, and a method for producing such pipe elements. The pipe element according to the invention is intended to be suitable in particular for drill rods, as used, for example, in petroleum drilling operations, or suitable for other applications such as drive shafts or a pipe connection between the petroleum source and conveying platform, which are used, for example, with off-shore oil production as so-called risers.

The object is achieved for the pipe element according to the invention in that the metal connector surrounds the pipe at the outer side with a connection region, in that there is provided a counter-sleeve which has contact with a connection region with the inner side of the pipe, and in that the metal connector and the counter-sleeve each have a cylindrical thread by means of which they are screwed to each other. As a result of the cylindrical screwing operation, it is ensured that the connection regions are brought into contact in a reliable and defined manner. The advantage of this solution is that the assembly of the connection between the metal connector and composite pipe is greatly simplified by only two metal components having to be screwed to each other. The cylindrical thread requires little structural space in a radial direction and is consequently very space-saving with respect to the diameter, which enables a very slim connection. In order to be able to transmit larger forces, the thread length and/or the length of the connection region on the pipe can be increased.

The pipe preferably has a fiber reinforcement of glass fibers or aramide fibers or in a particularly preferred manner of carbon fibers. In this instance, the fibers are arranged as a winding of rovings or fabric or scrim tapes in single or multiple layers and also in combination. The fiber reinforcement is surrounded by a plastics material matrix. Thermoplastic plastics materials or preferably duroplasts, such as epoxy resin are particularly suitable as a matrix material. The matrix material may already be present on the fiber reinforcement before the winding operation or it is applied during or after the winding operation. The hardening or consolidation is carried out by means of thermal processing in a furnace. The metal connector and the counter-sleeve are preferably of steel, cast steel, grey steel, aluminum alloy or titanium. In the case of drive shafts, in place of the conical thread for connecting two pipe elements, there are preferably used flanges via which the pipe elements are screwed to each other. The invention can also be advantageously used for such pipe elements.

Other advantageous features of the embodiment according to the invention which improve the quality of the connection and the assembly properties are set out in the dependent claims.

In order to achieve good force transmission and consequently a reliable and secure connection, the preferred length of the cylindrical thread on the metal connector and on the counter-sleeve is in the range between 10 and 500%, in a particularly preferred manner between 10% and 100% of the thread diameter. The preferred axial length of the connection region, in which the pipe is clamped between the metal connector and counter-sleeve, is between 10 and 500%, in a particularly preferred manner between 100% and 500% of the thread diameter.

The pipe element may have at the second pipe end, which is opposite one metal connector, a second metal connector which is connected to the pipe in the same manner as the first metal connector. It is thus possible for a plurality of pipe elements to be connected to each other in order to form a long strand which can transmit torques and axial forces. If the metal connectors have a conical thread, it is advantageous for the first metal connector to have a conical inner thread and the second metal connector to have a fitting conical outer thread. However, pipe elements having two conical inner threads each and two conical outer threads each can always be assembled alternately to form a longer strand.

In a particularly preferred manner, the pipe has at the outer side a connection region which constitutes a face which tapers conically in the direction toward the pipe end and which is in contact with the connection region of the metal connector, wherein this connection region is constructed as a correspondingly fitting conically shaped face. With respect to the connection regions, the term conical in this application is intended to be understood to mean that the face has either a straight conical shape or a rounded conical shape. The surface may thus have in the axial direction not only a straight, but also a continuously curved extent. The term conically tapering is intended to be understood to mean that the diameter of the face decreases in an axial direction, and the term conically expanding to mean that the diameter increases in an axial direction.

As a result of the conical shape, when screwing together, a surface pressure is produced on the connection region of the pipe between the metal connector and counter-sleeve via the cylindrical thread, whereby the connection can transmit higher forces. In addition to the clamping, adhesive may be applied between the metal connector and pipe in the connection region. This increases the strength of the connection and can ensure sealing between the inner space of the pipe and the environment. Furthermore, the adhesive reduces the friction between the components when the connection is produced between the pipe and metal connector.

Preferably, the inclination angle of the cone at the outer side of the pipe in the connection region with respect to the metal connector is between 0.1° and 30° with respect to the axis of the pipe, in a particularly preferred manner between 0.5° and 5°. Consequently, a particularly reliable connection can be achieved. An angle which is excessively shallow does not enable a high surface pressure and an angle which is excessively steep reduces the available axial length of the connection face.

In order to achieve an even higher surface pressure in the connection or as an alternative to the conical face at the outer side of the pipe, the pipe may have at the inner side a connection region which constitutes a face which tapers conically in the direction toward the pipe end and which is in contact with the connection region of the counter-sleeve, wherein the region is constructed as a correspondingly fitting conically shaped face. In this instance, adhesive may also be applied between the counter-sleeve and pipe.

Preferably, the inclination angle of the cone at the inner side of the pipe in the connection region with respect to the counter-sleeve is between 0.1° and 30° with respect to the axis of the pipe and in a particularly preferred manner between 0.5° and 5°.

In order to simplify the winding of the pipe during production, an inner pipe may be provided, in particular of metal or fiber-reinforced plastics material or thermoplastic plastics material, and may preferably be provided at the inner side with a coating, which comprises a material which is more resistant than the inner pipe with respect to oil or drilling fluid or other chemicals, wherein the composite fiber pipe is wound on the inner pipe in order to thus form the entire pipe structure, and wherein the inner pipe has a smaller wall thickness than the composite fiber pipe. As an alternative to the coating, the inner pipe may be produced from a material which is more resistant with respect to oil or drilling fluid or other chemicals.

In many applications, such as, for example, in drilling rods, data or electrical energy are intended to be transmitted via the pipe elements. To this end, there may be provided in the wall of the pipe or between the inner pipe and pipe a cable which extends from one pipe end to the other pipe end and which is connected to a connector which is located inside the metal connector and which is suitable for producing an electrical connection with respect to another connector or cable in another pipe element when the pipe element is screwed to the other pipe element via the in particular conical thread or the flange. An advantage is that the cable is protected in the wall of the pipe. The connector may in particular be constructed in an annular manner. The term connector in this instance is intended to be understood to generally refer to a component which is suitable for producing an electrical connection by means of which data or energy can be transmitted. The electrical connection between the pipe elements can be produced by means of physical contact of the connector with a counter-contact or by means of electromagnetic coupling of the connector to a counter-piece, that is to say, in a wireless manner. In this instance, a plurality of cables and/or a plurality of connectors may also be provided on a pipe element.

In order to protect the connector with respect to the inner space, in which oil or another medium flows, the counter-sleeve may have a protective shield which is arranged at the end of the counter-sleeve opposite the connection region and which is constructed in such a manner that the connector when viewed in a radial direction is located completely between the metal connector and the counter-sleeve when the pipe element is assembled.

In order to guide the cable in a manner protected from damage when screwing the metal connector of the pipe to the connector in the region of the metal connector, the counter-sleeve preferably has an axial groove in the cylindrical thread or an axial longitudinal hole in the material below the cylindrical thread. The groove is easier to produce. The longitudinal hole has the advantage that the thread is not interrupted and not weakened thereby.

So that the cylindrical screw connection between the counter-sleeve and the metal connector cannot become loose again when a plurality of pipe elements are screwed together and unscrewed during operation, it is advantageous for a torsion prevention means to be provided between the counter-sleeve and the metal connector. This torsion prevention means may in particular be constructed as a weld seam, preferably at the end face of the counter-sleeve. The weld seam may be constructed in a continuous annular manner or interrupted annular manner as a series of weld spots. Alternatively, the torsion prevention means may also be constructed as at least one pin which is inserted axially in a hole between the counter-sleeve and metal connector at the end face.

Since in many applications a fluid medium flows through the pipe element, such as, for example, oil or drilling fluid, it is important to keep the pressure loss low. To this end, it is advantageous for the inner face of the counter-sleeve to have an inner profile which extends in a completely continuous manner in an axial direction without edges or gradations. This continuous nozzle-like path leads to a flow-optimized pipe element having a small pressure loss in the region of the connection locations of the different pipe elements. Previously known pipe elements have the disadvantage that they bring about greater pressure losses in the region of the connections. As a result of the type of connection according to the invention between the metal connector and pipe, it is possible as a result of the counter-sleeve to produce an inner profile which is optimized in terms of flow.

For the method according to the invention for producing an above-described pipe element, the object is achieved in that:

the pipe is produced by fiber material being wound around a core, in particular on an inner pipe, the fiber material is wound over the counter-sleeve in the connection region when the pipe is produced, matrix material is applied together with or after the fiber material, the pipe is thermally processed together with the counter-sleeve in a furnace, wherein the matrix material hardens or is consolidated, and the metal connector is screwed with the cylindrical thread thereof onto the cylindrical thread of the counter-sleeve.

The method steps are preferably carried out in the sequence set out. The thermal processing involves in particular the pipe being heated to a temperature between 50 and 250° C. As a result of the counter-sleeve being over-wound in the connection region, a good planar contact between the pipe and counter-sleeve is directly produced and has a positive effect on the subsequent strength of the connection. A production in which the counter-sleeve is inserted in the furnace after the thermal processing is not possible when the connection region at the inner side of the pipe is constructed so as to taper in a conical manner in the direction toward the pipe end. In this instance, a production is only possible with the method according to the invention in which the counter-sleeve has already been over-wound in the connection region when the pipe is wound.

In order to produce a pipe element with a cable and connector, a cable can be applied in an axial or helical manner from one end to the other end to the inner pipe before the pipe is produced by winding of the layers; the connector is fitted onto the counter-sleeve after the thermal processing in the furnace and electrically connected to the cable before the metal connector is screwed on. A pipe element having an electrical data or energy connection can thus also be produced in a simplified manner. Alternatively, the cable can be applied axially or helically from one end to the other end to layers of the pipe which are already wound before the pipe is finished by means of further winding; the assembly of the connector follows as described above.

With reference to embodiments, other advantageous features of the invention are explained with reference to the drawings. The features mentioned can not only be advantageously implemented in the combination illustrated, but can also be combined with each other individually.

BRIEF DESCRIPTION OF THE SEVERAL VIEWS OF THE DRAWING

FIG. 6b is a sectioned 3D illustration with respect to 6a.

DESCRIPTION OF THE INVENTION

Figure 1A:
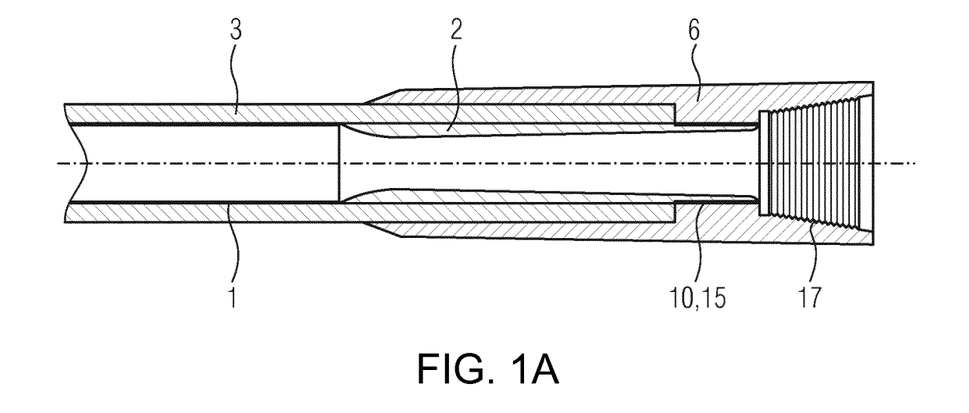
FIG. 1a shows an embodiment of a pipe element according to the invention with a longitudinal section of an inner conical thread.

The Figures are described in greater detail below. FIG. 1a shows a pipe element in which the pipe material of the pipe 3 is wound around a thin inner pipe 1. CRP is preferably used as a pipe material. The pipe 3 is clamped and/or adhesively bonded at the end thereof between the inner counter-sleeve 2 and the outer metal connector 6. The counter-sleeve 2 and metal connector 6 are screwed to each other by means of the cylindrical threads 10, 15 so that a reliable and defined contact is ensured in the connection region. The conical inner thread 17 is used for screwing to an additional pipe element which has a conical outer thread. At the left-hand side, the illustration is cut away. At the end which is not shown, the pipe element preferably has a second metal connector which is also secured and which in turn has a conical thread, for example, a correspondingly fitting outer thread. Long drill rods, pipe lines or drive shafts can thus be assembled from a plurality of elements. As a result of the fact that the connection is ensured by means of the cylindrical thread, very slim pipe elements can be produced, but nonetheless provide a high degree of strength of the connection. During production, fiber-reinforcement material (for example, rovings or material or scrim tapes) is first wound around the inner pipe 1 in several layers. The matrix material (for example, epoxy resin or another duroplast or thermoplastic plastics material) may already be present on the fiber-reinforcement material or it is applied to the layers during or after the winding. The counter-sleeve 2 is wound around in the connection region. Afterwards, the pipe 3 together with the inner pipe 1 and the counter-sleeve is thermally processed in a furnace so that the matrix material is hardened or consolidated. Subsequently, material which protrudes at the pipe end is separated and the metal connector 6 is screwed with the thread 15 thereof onto the cylindrical thread 10 of the counter-sleeve. In the connection region, it is possible to apply adhesive beforehand between the pipe 3 and the metal connector 6.

In place of the conical thread 17, the metal connector may also have a flange, which serves to screw the pipe element to another pipe element, for example, in drive shafts. The embodiment according to the invention is also advantageous in this instance.

The pipe element illustrated is particularly suitable for drill rods. In drill rods, the thread diameter of the cylindrical thread 10, 15 is in most cases between 80 and 180 mm. A particularly preferred embodiment for a drill rod in this diameter range has a cylindrical thread having a length between 50 and 150 mm. Regardless of the thread length mentioned, with such pipe elements the axial length of the connection region is preferably between 150 and 150 mm.

Figure 1B:
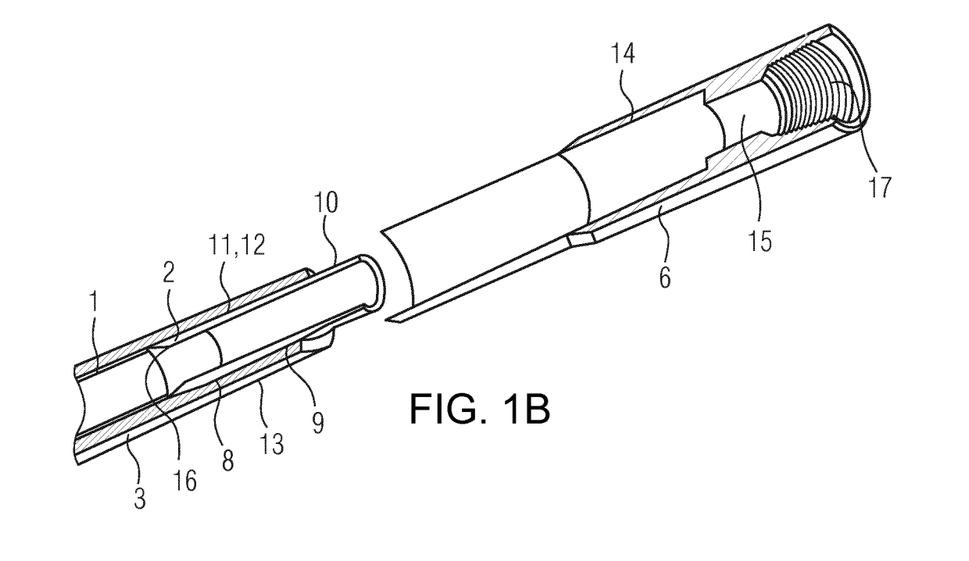
FIG. 1b is a 3D sectional illustration with respect to 1a before the screwing operation.

In FIG. 1b, the metal connector is not yet screwed on. In order to further increase the strength of the connection between the pipe 3 and metal connector 6, the inner and/or outer side of the fiber-reinforced pipe 3 may be constructed in the connection region so as to taper conically in the direction toward the end of the pipe. Consequently, by means of the metal connector 6 being screwed to the counter-sleeve 2, a clamping force is applied to the pipe 3 in the connection region so that the connection is given the required strength in order to be able to transmit higher torques and higher axial forces. In this instance, preferably only a portion of the connection region may also be constructed as a conical face. In the preferred embodiment illustrated, the metal connector 6 has a connection region 14 which expands conically in the direction toward the pipe and the pipe 3 has at the outer side a correspondingly conically tapering connection region 13. At the inner side of the pipe 3, the connection region 12 may also be constructed so as to taper conically in the direction toward the pipe end. The connection region 11 on the counter-sleeve 2 is then accordingly constructed in a conically fitting manner. The conical faces in the connection region may in this instance have a straight conical form or a rounded conical form, that is to say, along a curved line. In addition to the clamping, the metal connector 6 may be adhesively bonded to the pipe 3 in the connection region 13, 14. The adhesive bonding may in this instance also perform a sealing function between the inner space in the pipe and the environment. In order to achieve a high load-bearing capacity of the counter-sleeve and in order to prevent load peaks, the counter-sleeve 2 preferably has in the respective edge region of the conical connection region 11a radius as a transition, the concave radius 9 toward the region of the thread 10 and, at the other side, the convex radius 8.

It is also possible for the connection region 13 to be constructed in a conical manner only at the inner side of the pipe of the connection region 12 or only at the outer side of the connection region 13. If only the outer side is constructed in a conical manner and if the inner side is cylindrical, the counter-sleeve 2 can also be inserted in the furnace only after the pipe 3 has been thermally processed.

At the inner side, the counter-sleeve 2 has a flow-optimized inner profile 16 which keeps the pressure loss low when flowing through the pipe. This is achieved by an inner profile 16 in an axial direction which extends continuously at the inner length of the counter-sleeve, without diameter changes, so-called gradations, and without bends or edges. The lower pressure loss is highly advantageous with pipes for conveying petroleum or with drill rods through which drilling fluid is pumped at high pressure. The inner pipe 1 may be provided with a coating which is more resistant with respect to oil, drilling fluid or other chemicals, and which reduces the friction resistance of the inner pipe wall to the flow.

Figure 2A:
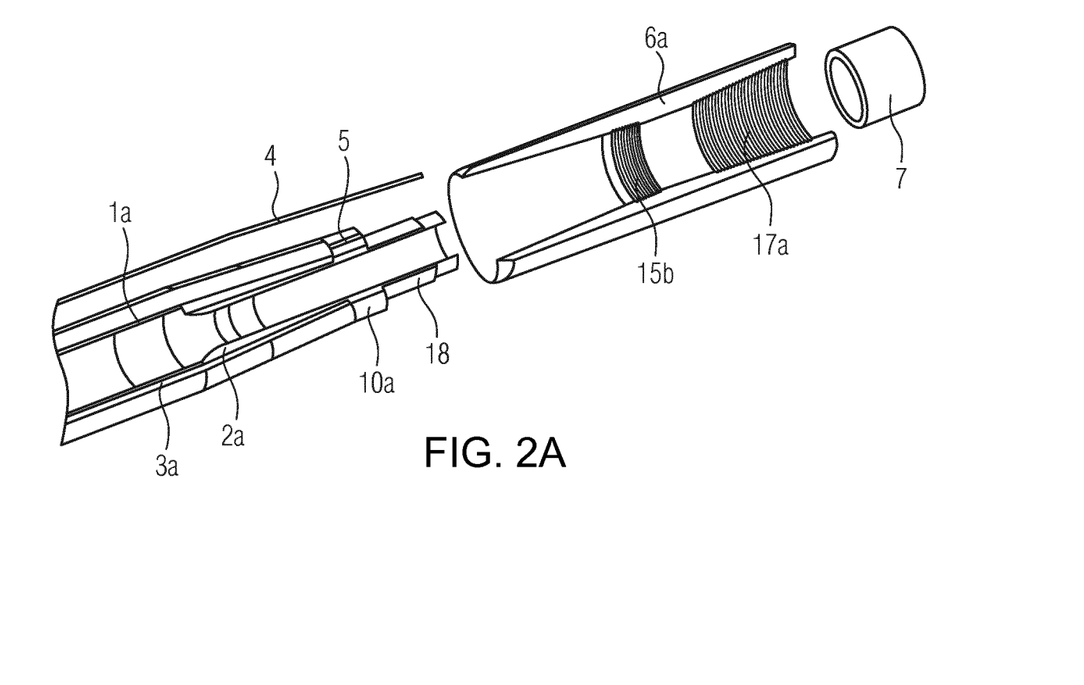
FIG. 2a is a sectioned exploded 3D view of an embodiment of a pipe element according to the invention with a cable and a connector.

FIG. 2a illustrates a pipe element having a cable 4 and connector 7 for data or energy transmission. Reference numerals which are the same refer to components which are the same. In the cylindrical thread 10 on the counter-sleeve, in this embodiment there is provided a groove 5 in which the cable 4 is guided. For illustration, the cable 4 is illustrated separately in the exploded view although it extends according to the invention between the inner pipe 1a and pipe 3a or within the pipe wall of the pipe 3a and then through the groove 5 as far as the connector 7. As an alternative to the groove 5, it would also be possible to have below the thread 10 a longitudinal hole in which the cable 4 is guided to the connector 7 from the outlet out of the pipe 3a. It is also possible for a plurality of cables or cable strands to be guided through the threaded region in the same manner through grooves or holes which are distributed on the periphery. In any case, the cable 4 is protected from damage when the cylindrical thread is screwed together. In order to provide space for the connector 7, the threaded sleeve 2a protrudes further beyond the thread 10a. It thereby forms a protective shield 18 for the connector 7 with respect to the inner space of the pipe element. The metal connector 6a also has a region between the cylindrical thread 15a and the conical thread 17a in order to receive the connector.

Figure 2B:
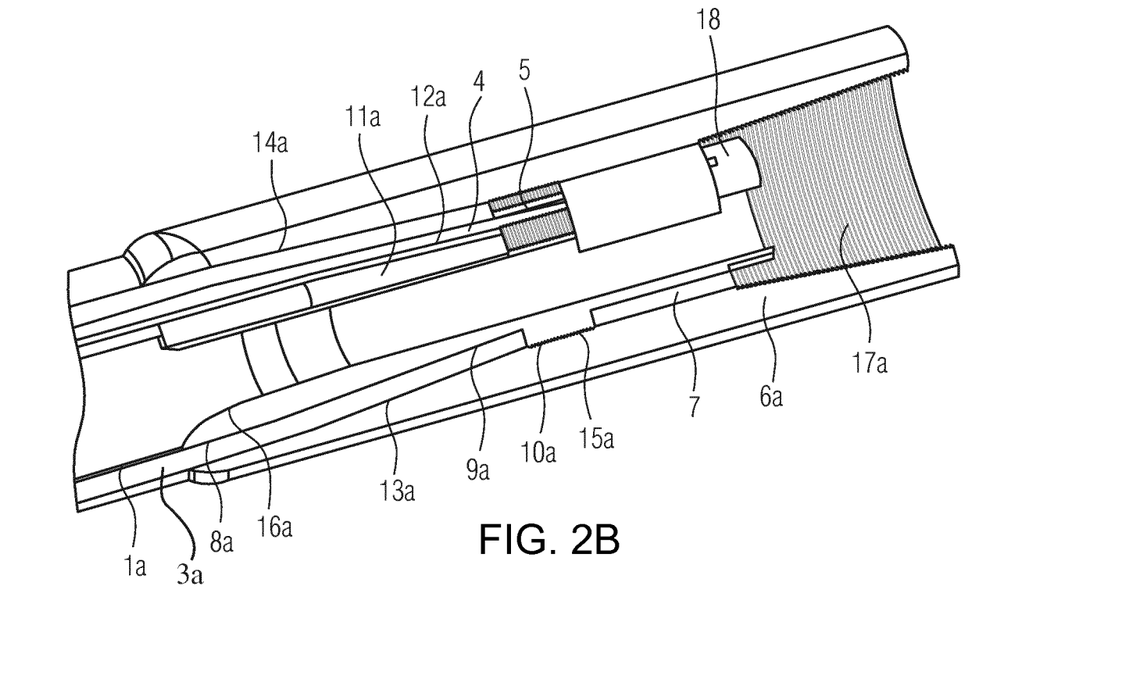
FIG. 2b is a sectioned 3D illustration with respect to 2b in the assembled state.

FIG. 2b shows the pipe element in the assembled state. The connector 7 is located when radially viewed completely between the protective shield 18 and the metal connector 6a. If the pipe element is screwed via the conical thread 17a to another pipe element which has a fitting connector, a data or energy transmission can be carried out. The cable 4 which is connected to the connector 7 extends through the thread in the groove 5 and then within the wall of the pipe 3a as far as the other end of the pipe (not illustrated). As an alternative to the groove 5, the cable 4 could also be guided in a longitudinal hole below the thread. As a result of the conical extent of the connection regions 11a, 12a and 13a, 14a, as a result of the screwing of the cylindrical threads 10a, 15a, an adequate pressing force is applied to the pipe wall of the pipe 3a so that the connection can transmit higher torques and axial forces. So that no load peaks occur, the transition regions of the conical connection region 11a are constructed on the counter-sleeve with radii 8a and 9a. The inner profile 16 of the counter-sleeve is in turn constructed in a flow-optimized manner without gradations and without edges or bends.

Figure 3:
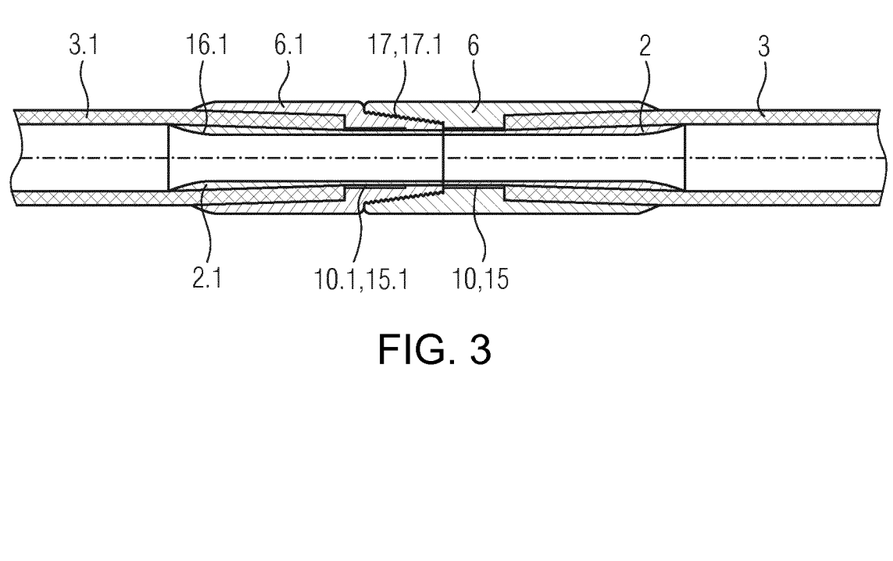
FIG. 3 shows the connection of two pipe elements according to the invention.

FIG. 3 shows two pipe elements which are screwed to each other. One pipe element has a conical outer thread 17.1, the other a conical inner thread 17. The connection between the metal connector 6, 6.1 and pipe 3, 3.1 is carried out in the same manner by the metal connectors being screwed by means of the cylindrical threads 10, 15 and 10.1, 15.1 to the respective counter-sleeve 2, 2.1. The inner profile 16.1 can again also be constructed in a flow-optimized manner. It is again possible to see the conical construction of the connection regions in order to produce a higher pressing force.

Figure 4:
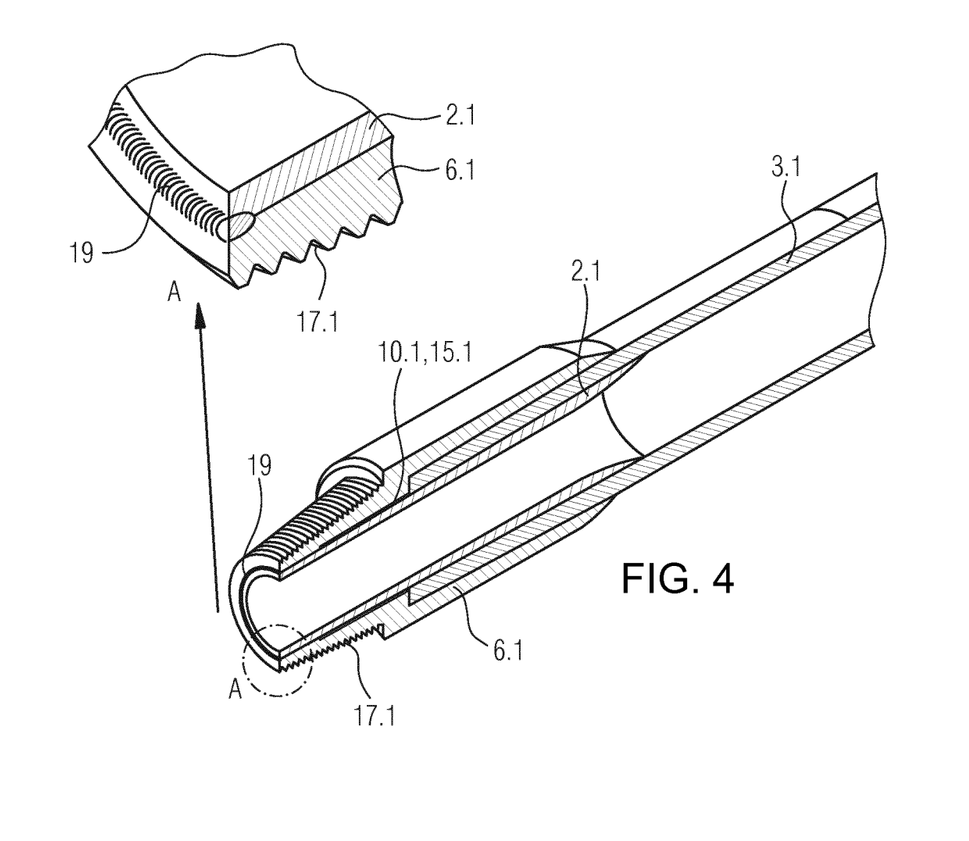
FIG. 4 shows an embodiment of a pipe element according to the invention with an outer conical thread and with torsion prevention means by means of a weld seam.

FIG. 4 shows a pipe element having a conical outer thread 17.1 which has a torsion prevention means in the form of an annular weld seam 19. As a result of the torsion prevention means, it is ensured that the metal connector 6.1 can no longer be released from the counter sleeve 2.1, even when torque forces are applied via the screw connection 17. The torsion prevention means by means of a weld seam can also be used with other pipe elements according to the invention. The cut-out A is an enlarged view of the weld seam 19.

Figure 5:
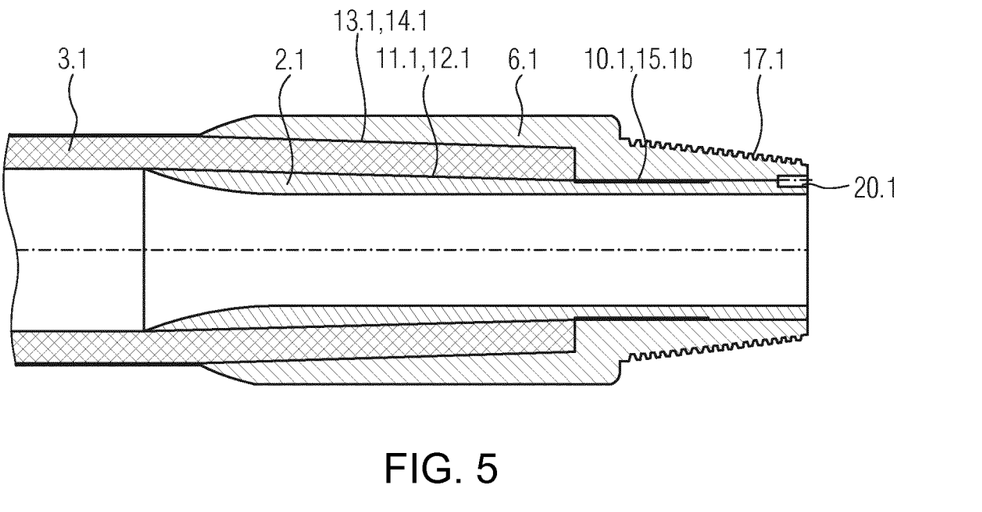
FIG. 5 shows another embodiment of a pipe element according to the invention with an outer conical thread and with torsion prevention means by means of the pin.

The pipe element illustrated in FIG. 5 has another type of torsion prevention means, that is to say, by a pin 20.1 being axially inserted into a hole at the transition between the counter-sleeve 2.1 and metal connector 6.1. It is again also possible to see in this instance the conical connection regions 11.1, 12.1 and 13.1, 14.1, the connection regions 12.1 and 13.1 being constructed so as to taper conically in the direction toward the pipe end.

Figure 6A:
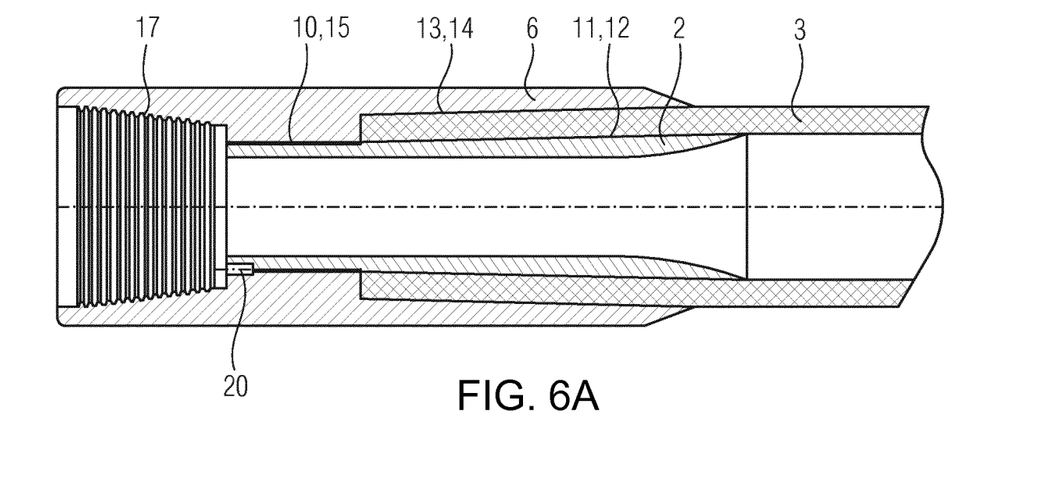
FIG. 6a shows another embodiment of a pipe element according to the invention having an inner conical thread and with torsion prevention means by means of the pin.
Figure 6B:
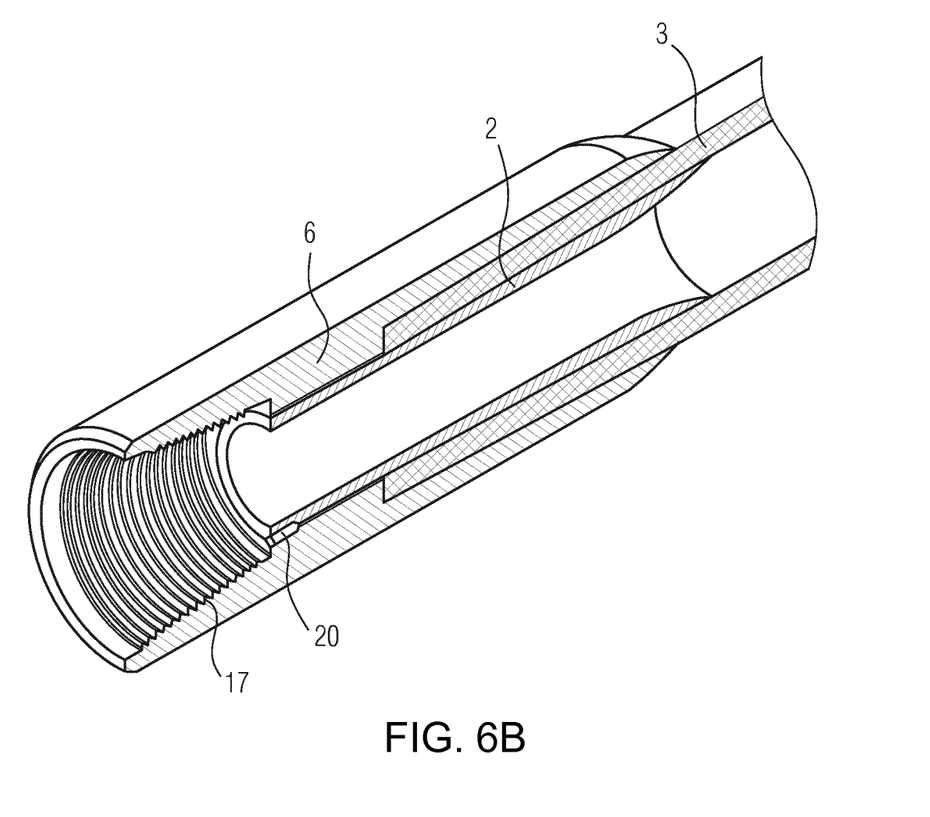

FIG. 6a again shows a pipe element having a conical outer thread 17. The torsion prevention means is inserted in this instance by a pin 20 at the transition between the counter-sleeve 2 and metal connector 6. All the variants for torsion prevention can also be transferred to the pipe elements with the connector. In the perspective illustration in FIG. 6b, the embodiment of the torsion prevention means as a pin 20 can be seen clearly.

LIST OF REFERENCE NUMERALS 1, 1a Inner pipe
2, 2.1, 2a Counter-sleeve
3, 3.1, 3a CRP pipe
4 Cable
5 Recess in the thread for cable
6, 6.1, 6a Metal connector
7 Connector
8, 8a Convex radius at the outer side on the counter-sleeve
9, 9a Concave radius at the outer side on the counter-sleeve
10, 10.1, 10a Cylindrical outer thread on the counter-sleeve
11, 11.1, 11a Connection region of the counter-sleeve
12, 12.1, 12a Connection region at the inner side of the CRP pipe
13, 13.1, 13a Connection region at the outer side of the CRP pipe
14, 14.1, 14a Connection region of the metal connector
15, 15.1, 15a Cylindrical inner thread on the metal connector 16, 16.1, 16a Continuous inner profile
17, 17a Conical inner thread of the metal connector
17.1 Conical outer thread of the metal connector
18 Protective shield for connectors
19 Weld seam
20, 20.1 Pin for torsion prevention

The invention claimed is:

1. A pipe element, comprising:
a pipe of fiber-reinforced plastics material, said pipe having a radially outer side and a radially inner side;
a metal connector connected to said pipe to enable torques and axial forces to be transmitted between said pipe and said metal connector, said metal connector being formed with a thread or having a flange for screwing said metal connector to another metal connector of another pipe element in order to connect said metal connector to said another pipe element;
said metal connector surrounding said pipe at the outer side within an outer connection region;
a one-piece counter-sleeve disposed in contact with the radially inner side of said pipe within an inner connection region; and
each of said metal connector and said counter-sleeve being formed with a cylindrical thread by way of which said metal connector and said counter-sleeve are screwed to one another.

2. The pipe element according to claim 1, wherein said metal connector is formed with a conical thread.

3. The pipe element according to claim 1, wherein said metal connector is a first metal connector, and comprising a second metal connector disposed at an end of said pipe opposite said metal connector, said second metal connector being connected to said pipe in the same manner as the first metal connector.

4. The pipe element according to claim 1, wherein said pipe is formed with a further connection region at the outer side which constitutes a face that tapers conically toward the pipe end and which is in contact with said outer connection region of said metal connector, and wherein said outer connection region is constructed as a correspondingly fitting conically shaped face.

5. The pipe element according to claim 4, wherein an inclination angle of a cone formed at the outer side of the pipe in said further connection region with respect to the metal connector lies between 0.1° and 30° with respect to an axis of said pipe.

6. The pipe element according to claim 1, wherein said pipe has a connection region at the radially inner side which constitutes a face that tapers conically toward a pipe end and which is in contact with said inner connection region of said counter-sleeve, wherein said region is constructed as a correspondingly fitting conically shaped face.

7. The pipe element according to claim 6, wherein an inclination angle of a cone at the inner side of said pipe in the connection region with respect to the counter-sleeve lies between 0.1° and 30° with respect to an axis of said pipe.

8. The pipe element according to claim 7, wherein the inclination angle of the cone at the radially inner side lies between 0.5° and 5° and wherein an inclination angle of a cone formed at the radially outer side of the pipe lies between 0.5° and 5° with respect to the axis of said pipe.

9. The pipe element according to claim 1, which further comprises an inner pipe formed with a coating of a material which is more resistant than the inner pipe with respect to oil or other chemicals, wherein the pipe is wound on the inner pipe, and wherein the inner pipe has a smaller wall thickness than the pipe.

10. The pipe element according to claim 9, wherein said inner pipe is formed of metal or fiber-reinforced plastics material and is provided with a coated radially inner side thereof.

11. The pipe element according to claim 1, which comprises a cable in a wall of said pipe, or between an inner pipe and said pipe, said cable extending from one pipe end to an opposite pipe end and being connected to a connector located inside said metal connector and being configured for producing an electrical connection with respect to another connector or cable in another pipe element when the pipe element is screwed to the other pipe element via said conical thread or said flange.

12. The pipe element according to claim 11, wherein said counter-sleeve has a protective shield disposed at an end of said counter-sleeve opposite said connection region and constructed so that said connector, when viewed in a radial direction, is located completely between said metal connector and said counter-sleeve.

13. The pipe element according to claim 11, wherein said counter-sleeve is formed with an axial groove in said cylindrical thread or an axial longitudinal hole in a material below said cylindrical thread, for guiding a cable from said pipe to said connector.

14. The pipe element according to claim 1, which comprises a torsion prevention device disposed between said counter-sleeve and said metal connector.

15. The pipe element according to claim 14, wherein said torsion prevention device is a weld seam at an end face of said counter-sleeve or at least one pin inserted in an axial direction.

16. The pipe element according to claim 1, wherein an inner face of said counter-sleeve has an inner profile extending in a completely smooth continuous manner in an axial direction without edges or steps.

17. A method of producing a pipe element in accordance with claim 1, the method comprising:
providing a counter-sleeve with a cylindrical thread;
forming a pipe by winding fiber material around a core and thereby winding the fiber material over the counter-sleeve in a connection region with the pipe;
applying matrix material together with or after the fiber material;
thermally processing the pipe together with the counter-sleeve in a furnace, and thereby hardening or consolidating the matrix material; and
screwing a metal connector with a cylindrical thread thereof onto the cylindrical thread of the counter-sleeve;
to thereby produce a pipe element according to claim 1.

18. The method according to claim 17, wherein the core is an inner pipe.

19. The method according to claim 17, which comprises placing a cable in an axial direction from one end to an opposite end of the inner pipe prior to winding the pipe, and fitting a connector onto the counter-sleeve and electrically connecting the connector to the cable before screwing on the metal connector.

20. The method according to claim 17, which comprises applying a cable axially from one end to another end to layers of the pipe which have already been wound, prior to finishing the pipe by further winding, and fitting a connector on the counter-sleeve and electrically connecting the connector to the cable before screwing on the metal connector.

* * * * *